United States Patent [19]

Caldwell et al.

[11] Patent Number: 4,519,045

[45] Date of Patent: May 21, 1985

[54] ELECTRONIC DATA PROCESSING APPARATUS WITH EQUATION OPERATING SYSTEM HAVING IMPROVED UNARY OPERATION IMPLEMENTATION

[75] Inventors: David Caldwell; Linda J. Ferrio; Arthur C. Hunter, all of Lubbock, Tex.

[73] Assignee: Texas Instruments Incorporated, Dallas, Tex.

[21] Appl. No.: 584,707

[22] Filed: Feb. 29, 1984

Related U.S. Application Data

[62] Division of Ser. No. 381,985, May 25, 1982.

[51] Int. Cl.³ .......................... G06F 7/48; G06F 3/02
[52] U.S. Cl. .................................... 364/709; 364/715
[58] Field of Search ............................. 364/709, 715

[56] References Cited

U.S. PATENT DOCUMENTS

| | | | |
|---|---|---|---|
| 3,781,820 | 12/1973 | Cochran et al. | 364/709 |
| 4,053,753 | 10/1977 | Sado et al. | 364/709 |
| 4,302,816 | 11/1981 | Yamamoto | 364/709 |
| 4,412,300 | 10/1983 | Watson et al. | 364/709 |

Primary Examiner—David H. Malzahn
Attorney, Agent, or Firm—Robert D. Marshall, Jr.; N. Rhys Merrett; Melvin Sharp

[57] ABSTRACT

The equation operating system is an improved data and command entry format together with a compatible operation system for use with electronic data processing apparatuses, most particularly with scientific calculators which provide an alphanumeric display of entered equations. This invention also includes a unary operation implementation technique, whereby the operand may be entered either before or after the unary operation.

8 Claims, 7 Drawing Figures

ELECTRONIC DATA PROCESSING APPARATUS WITH EQUATION OPERATING SYSTEM HAVING IMPROVED UNARY OPERATION IMPLEMENTATION

This is a division of application Ser. No. 381,985, filed May 25, 1982.

BACKGROUND OF THE INVENTION

The field of the present invention is electronic data processing apparatuses and more specifically to the so called scientific calculators. Scientific calculators are typically hand held or desk top devices which include a manually actuable keyboard for receiving input data and operational commands from the operator and a visual display for communicating the results to the operator. A more recent development is the provision of an alphanumeric display which may be employed to display the sequence of operations in an inputted equation in order that the operator may check this equation for accuracy and possible revision prior to evaluation.

The increasing complexity of these scientific calculators together with the trend toward providing alphanumeric equation displays has provided impetus to the search for more user friendly entry formats and operational sequences. The previous calculators employed a so called chain arithmetic format, in which each operation is performed in the order in which it is entered, regardless of the relative hierarchical ranks of such operations in written form. Later calculators, as exemplified in U.S. Pat. No. 4,208,720 entitled "Calculator with Algebraic Operation System" by Herman W. Harrison, provided operation upon entered command sequences based upon the hierarchical rank of the entered operations as modified by open and closed parenthesis. Other solutions to this problem include the reverse Polish notation which is relatively efficient in terms of key strokes required for evaluation of most equations, however it has the disadvantage of requiring a completely different approach for entry than the manner in which an equation is ordinarily written.

One major problem with an alphanumeric display of an entered equation is that, typically, such alphanumeric displays do not have any provision for more than a single line of characters. Therefore, it is difficult to easily represent exponentiation in the written manner in which the operator is most familiar. Typically such calculators would employ a YX character to indicate that the numeric data preceeding this character is to be raised to the power of the numeric data following this character. Although such a character unambiguously depicts this exponentiation, this character is conceptually removed from the superscript notation employed in written equations.

A further problem occurs with the prior art calculators of the scientific type in that they typically are not constructed to perform implied multiplication. Implied multiplication is often used in written equations between numbers, variables, functions and open and closed parenthesis. Provision in the operating system of a scientific calculator to evaluate and properly perform implied multiplication would typically reduce the number of keystrokes required for entry of equations.

Scientific calculators differ in the manner in which the operand is entered for unary operations. Unary operations are operations which require a single operand such as the trigonometric functions of sine, cosine and tangent and the common and natural logarithms. Early scientific calculators typically performed such unary operations immediately when entered using the currently displayed number as the operand. This differs from the typical written representation of such functions in which the operand generally follows the function. Some scientific calculators, particularly those in which alphanumeric equation display is provided, require that the operand be entered following the function in the manner in which these functions are typically written. Because of this split between the manner in which the operand and the operator are entered, it is often confusing to a user who switches between one machine and another. This is because the user will often not know the particular operating sequence of that machine without experimentation.

SUMMARY OF THE INVENTION

It is an object of the present invention to provide an improved data and command entry format together with an improved operating sequence to enhance the operator/machine interface when entering equations. This invention is most applicable to scientific calculators which employ an alphanumeric display to show the entered operations. It is the aim of this invention to provide an entry format compatible with an alphanumeric display which greatly corresponds to the manner in which equations are written, or if such correspondence is not possible, which employs a format easily recognizable by the operator as a particular function.

One manner in which the object of the present invention is achieved is by providing a operating sequence in which a unary operational command operates on an operand which may be entered either before or after the unary operational command. A unary operation is completed by entry of an operational command having a lower hierarchical rank. The operand which is used is the value stored in a numeric display register. Thus a latter entered number, constant, variable or computational expression is the operand if there is such a later entry, otherwise previous entries determine the operand.

In a special case, the change sign command, an actual operand search is performed to use a later entered data as the operand if available, otherwise to use prior entered data as the operand.

BRIEF DESCRIPTION OF THE DRAWINGS

The above object of the present invention together with the manner of operation will be more fully explained below in conjunction with the following figures.

DETAIL DESCRIPTION OF THE PREFERRED EMBODIMENT

Figure 1:
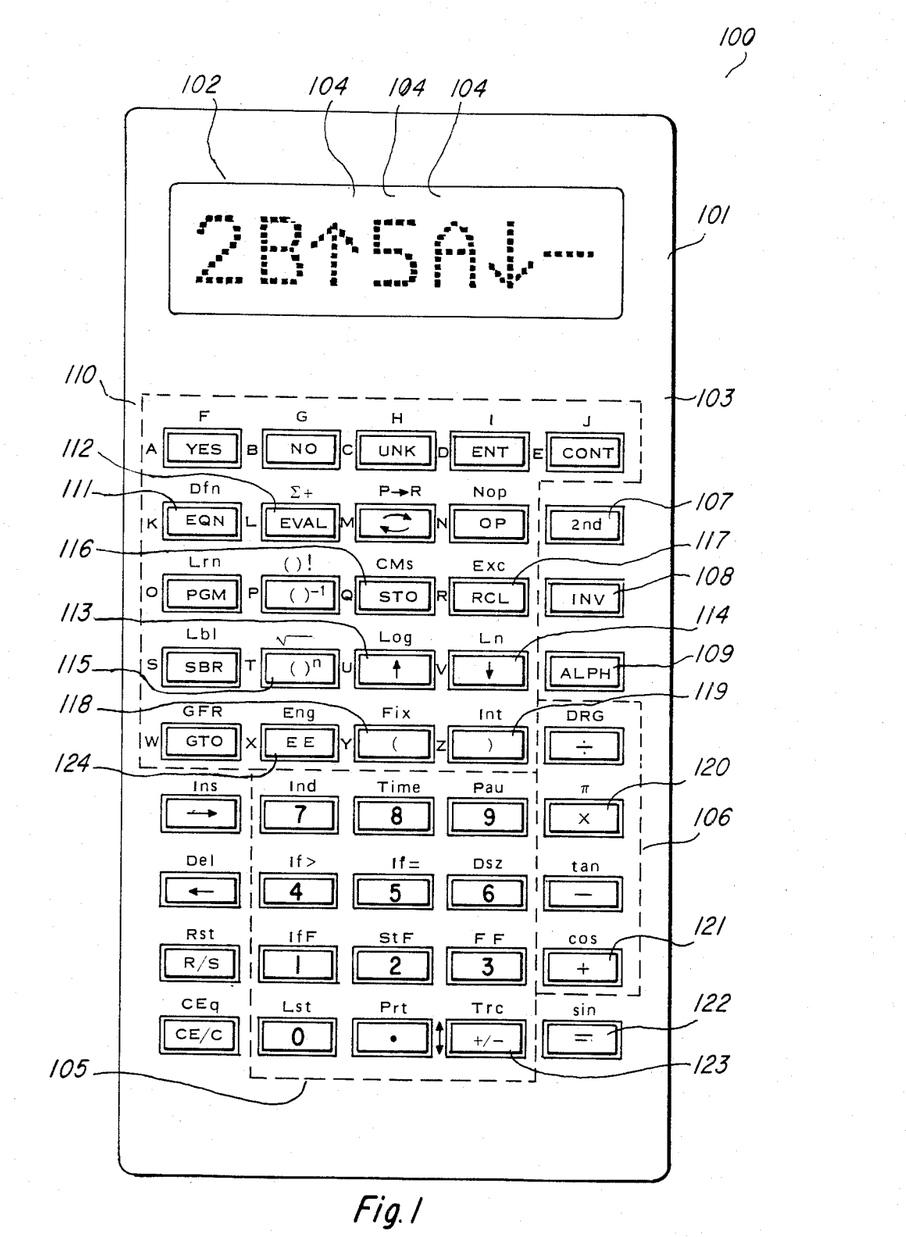
FIG. 1 illustrates the front panel of a data processing apparatus such as may be used to embody the present invention.

FIG. 1 illustrates the front panel of a data processing apparatus such as may be employed to embody the present invention. Data processing apparatus 100 includes case 101, display 102 and keyboard 103. FIG. 1 thus illustrates all of the operator/machine interface components of the electronic data processing apparatus of the present invention.

Display 102 is primarily employed to provide a visual indication of the results generated by data processing apparatus 100. As a further convenience to the operator, display 102 is adapted to provide a visual indication of an equation entered by the operator. Display 102 includes a plurality of character positions 104. Each character position 104 is capable of providing a visual display of an alphanumeric character. Each character position 104 is preferably embodied by a 5 by 7 dot matrix of liquid crystal display elements, each of which are selectively actuable. By actuation of a subset of these thirty five liquid crystal display elements, it is possible to display each of the digits zero to nine, each of the letters of the alphabet and a wide variety of individual characters corresponding to particular operational commands.

Keyboard 103 includes a plurality of momentarily actuable key switches arranged in rows and columns. The key switches are scanned to determine which key switch, if any, is depressed and depending upon the order of key switch depression the particular data entry or operational entry is determined.

Keyboard 103 includes numeric entry keys 105. Numeric entry keys 105 include the decimal digits zero to nine, a decimal point and a change sign key 123. Taken together, these keys enable entry of any numeric data desired into the data processing apparatus 100.

Keyboard 103 includes four function operation keys 106. These four functions include the mathematical operations of addition, subtraction, multiplication and division. Actuation of these keys enters the corresponding mathematical operational command into data processing apparatus 100. These four mathematical operations form the basis for the great majority of all calculations performed.

Due to the limited number of keys which can be placed upon case 101, keyboard 103 includes keys which are used to redefine the function of other of the keys. Each of the keys of keyboard 103 has its primary function written upon the face of the key. In addition, most of the keys have a secondary function written upon the face of case 101 above the key. Depression of a sequence including second key 107 followed by any of the keys which has a secondary function, results in entry of the secondary function into data processing apparatus 100. For example, depression of key 120 enters the primary function of the key which is multiplication. Depression of second key 107 followed by key 120 enters the secondary function of key 120 which is the numeric constant pi. Similarly inverse key 108 is employed to redefine the operation of some of the other keys of keyboard 103 to the inverse of their primary operations. Inverse key 108 may be used in conjunction with second key 107 to redefine the operation of a single key. For example, depression of second key 107 followed by depression of key 121 enters the secondary function of the key which is the trigonometric function cosine. Entry of second key 107, inverse key 108 and key 121 enters the inverse of the secondary function which is the arccosine function. Recall key 117 is employed with keys 110 in order to enter alphabetic variable identifiers. For example, depression of recall key 117 followed by depression of key 113 enters the alphabetic character U. It should be noted that the alphabetic characters F, G, H, I, and J are entered as secondary functions via second key 107 after entering recall key 117.

Keyboard 103 includes key switches for additional functions. Keyboard 103 includes equation mode key 111, and evaluation key 112. These keys are employed to enter equation mode and to evaluate the results of an entered equation. Keyboard 103 includes store key 116 and recall key 117. Store key 116 is employed to store a particular numeric value in one of a group of user memories designated by the alphabetic characters. Similarly, recall key 117 is employed to recall the numeric data stored in a designated one of the user accessible memories corresponding to one of the alphabetic characters. Keyboard 103 includes exponentiation functions up arrow key 113, down arrow key 114 and integral power exponentiation key 115. Keyboard 103 includes left parenthesis key 118 and right parenthesis key 119 which are employed to modify the hierarchy of operation when entering equation into data processing apparatus 100. The use of these keys and the manner in which data processing apparatus 100 operates on these functions will be more fully described below.

Figure 2:
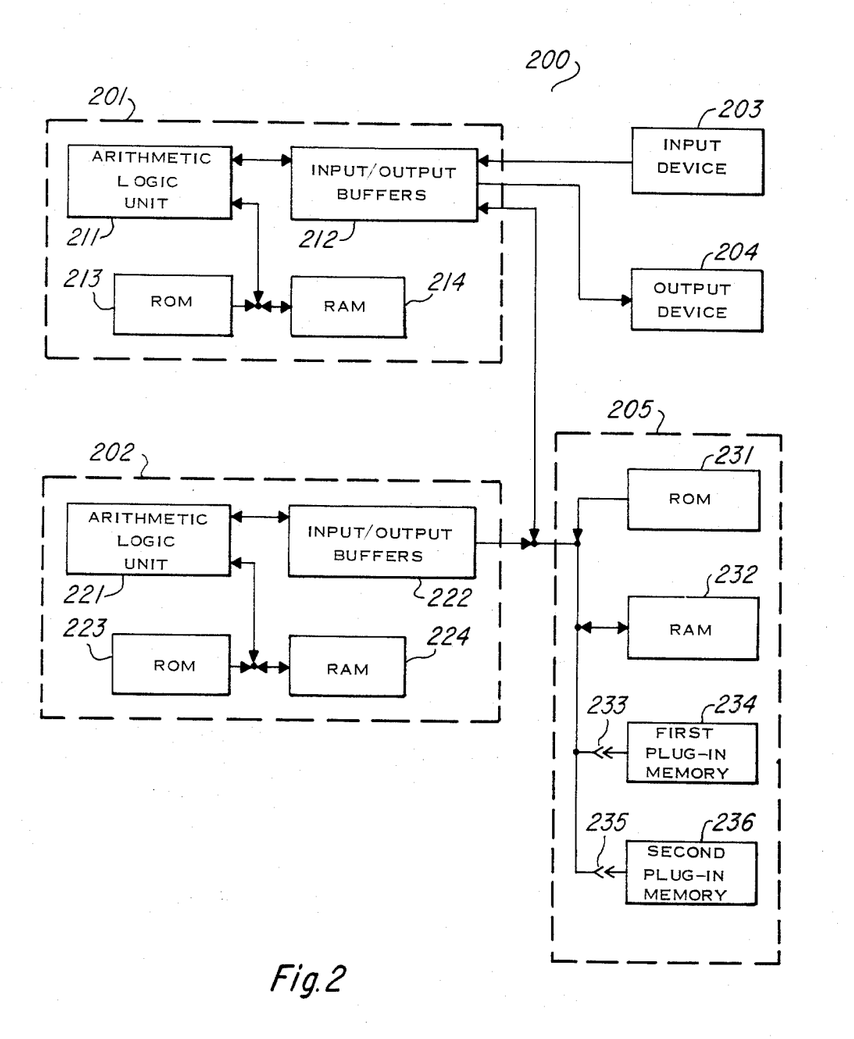
FIG. 2 illustrates a block diagram of a data processing apparatus such as may be employed to embody the present invention.

FIG. 2 illustrates the block diagram of the preferred embodiment of the present invention. Data processing 200 includes first microcomputer 201, second microcomputer 202, input device 203, output device 204 and memory system 205.

First microcomputer 201 includes arithmetic logic unit 211, input/output buffers 212, read only memory 213 and random access memory 214. First microcomputer 201 is preferably embodied in a single integrated circuit. First microcomputer 201 is employed as an input/output controller and as a master process controller. First microcomputer 201 is coupled to input device 203 and output device 204 via input/output buffers 212. Input device 203 would typically be embodied by keyboard 103 illustrated in FIG. 1. Actuation of any of the keys of keyboard 103 would be coupled to first microcomputer 201 via input/output buffers 212 and thereafter would be identified by arithmetic logic unit 211 in conjunction with a control program permanently stored in read only memory 213. This detected input command may be temporarily stored in random access memory 214 or may be transmitted via input/output buffers 212 to second microcomputer 202 or to memory system 205. Similarly, read only memory 213 preferably includes data for generating the proper character output in accordance with characters to be output so that arithmetic logic unit 211 may provide the proper signal to output device 204 via input/output buffers 212. Output device 204 would typically be embodied by display 102 illustrated in FIG. 2. This output character may have either been temporarily stored in random access memory 212 or may have been transmitted to first microcomputer 201 from second microcomputer 202 or memory system 205.

In a manner similar to the construction of first microcomputer 201, second microcomputer 202 includes arithmetic logic unit 221, input/output buffers 222, read only memory 223 and random access memory 224. Second microcomputer 202 is also preferrably embodied in a single integrated circuit chip. Second microcomputer 202 is employed as a memory access unit providing coupling between first microcomputer 201 and memory system 205. In addition, second microcomputer 202 may also be employed to perform calcuations requested by first microcomputer 201. For example, first microcomputer 201 may need a particular program or a particular set of data stored in memory system 205. First microcomputer 201 would send a request for this program or data to second microcomputer 202. Second microcomputer 202 would then identify the particular memories to be accessed, withdraw the data from these memories and transmit them to first microcomputer 201. In addition, second microcomputer 202 may have certain predetermined dedicated functions which it may perform under control of first microcomputer 201. In this case first microcomputer 201 would send instructions to second microcomputer 202 on the nature of the task to be performed. Thereafter second microcomputer 202 would perform this task, which may involve access to memory system 205, and then transmit the result to first microcomputer 201. First microcomputer 201 and second microcomputer 202 are preferrably embodied by identical single integrated circuits except for the particular structure of their respective read only memories, which define their specific functions.

Memory system 205 includes a variety of separate memories. These separate memories include read only memory 231 and random access memory 232 which are provided with the data processing apparatus 200. Data processing apparatus 200 also includes plug-in ports 233 and 235. Plug-in port 233 is designed to receive first plug-in memory 234. Similarly, plug-in port 235 is designed to receive second plug-in memory 236. First plug-in memory 234 and second plug-in memory 236 may include additional read only memory which provides a utilization program for data processing apparatus 200. In addition, first plug-in memory 234 and second plug-in memory 236 may provide additional random access memory for storage of additional data or user written programs. In addition, first plug-in memory 234 and second plug-in memory 236 may provide different functions, depending upon the specific use to which data processing apparatus 200 is currently dedicated.

The particular structure of data processing apparatus 200 illustrated in FIG. 2 represents merely a convenient design choice for implementation of the present invention. However, such a design choice provides a relatively large amount of computational power and a flexible organization so that data processing apparatus 200 may be employed in a wide variety of applications.

The operation of the data processing apparatus of the present invention will now be described in conjunction with the flow charts illustrated in FIGS. 3, 4, 5, 6 and 7. It is understood that these flow charts illustrate the general steps in the operation of the data processing apparatus 200 and are not intended to illustrate the exact programs performed. It should be understood that one skilled in the art of design of such data processing apparatuses would be able to provide the proper exact program to be stored in read only memories 213, 223 and 231 to perform the functions illustrated in flow charts of FIGS. 3, 4, 5, 6 and 7 once selection is made of the particular microcomputer employed as first microcomputer 201 and second microcomputer 202 with their particular instruction set.

Figure 3:
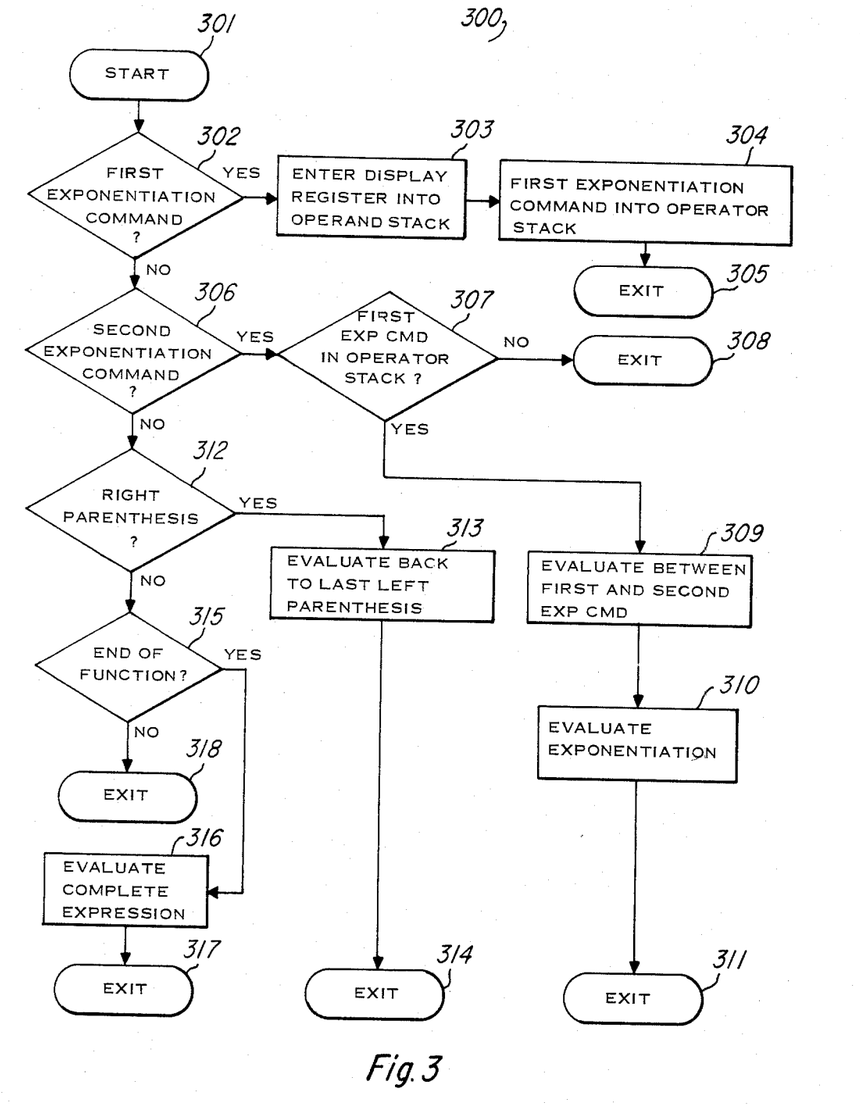
FIG. 3 is a flow chart illustrating the manner of evaluation of the first and second exponentiation commands in accordance with the present invention.

FIG. 3 illustrates a flow chart of the operation of a data processing apparatus in accordance with the present invention particularly describing the operation of the data processing apparatus implementing first and second exponentiation commands. It should be understood that the operations illustrated in FIG. 3 represent only a portion of the operations performed by data processing apparatus 200. Additional operations performed by data processing apparatus 200 are conventional in nature and will not be further described herein. It should also be understood that the flow chart illustrated in FIG. 3 represents a preferred embodiment of the general steps employed in operation of a data processing apparatus in accordance with the present invention and is not intended to illustrate the only manner in which the present invention may be practiced. In addition, it should be understood that the flow chart of FIG. 3 illustrates only the overall general steps of the operation of the present invention and is not intented to illustrate the exact detail machine operations required to practice this invention.

FIG. 3 illustrates program 300. Program 300 is begun via entry block 301. Program 300 first tests to determine whether a first exponentiation command has been received (decision block 302). In the preferred embodiment entry of a first exponentiation command is achieved by actuation of up arrow key 113. In the event that such a first exponentiation command has been received then several actions are taken. Firstly, the current numeric value in the numeric display register is stored in an operand stack (processing block 305). This operand stack is a plurality of memory locations within data processing apparatus 200 which are employed to store entered operands prior to execution of a calculation. In data processing apparatus 200 this operand stack is preferably a part of random access memory 214, however, this operand stack may be formed as a part of RAM 224 or RAM 223. The presently described operand stack in addition to the operator stack described below, generally operate in accordance with the principles described in U.S. Pat. No. 4,208,720 entitled "Calculator With Algebraic Operating System" by Herman W. Harrison. After entry of data into the operand stack, program 300 then enters the first exponentiation command into the operator stack (processing block 304). Then program 300 is exited via exit block 305.

In the event that a first exponentiation command has not been received, program 300 tests to determine whether a second exponentiation command has been received (decision block 306). Momentary actuation of down arrow kay 114 enters the second exponentiation command in the preferred embodiment. If such a second exponentiation command has been received, program 300 then tests to determine whether a first exponentiation command is in the operator stack (decision block 307). If the entered second exponentiation command has not been preceded by a first exponentiation command already stored in the operator stack, then this second exponentiation command is meaningless. Therefore, program 300 is exited via exit block 308.

In the event that a corresponding first exponentiation command is found within the operator stack, program 300 evaluates the expression between the most recent first exponentiation command and the just entered second exponentiation command (processing block 309). Program 300 then evaluates the exponentiation using the result of the previous calculation as the exponent and a newly recalled number from the operand stack as the base (processing block 310). This step involves placing the calculated result in a corresponding position within the operand stack for later use in additional calculations if entered. Program 300 is then exited via exit block 311.

In the event that a second exponentiation command is not received, program 300 tests to determine whether a right parenthesis has been entered. In the preferred embodiment entry of such a right parenthesis is achieved by a momentary depression of right parenthesis key 119. In the event that such a right parenthesis is received then program 300 evaluates the expression including the numeric data and operational commands entered between the last entered left parenthesis and the immediately preceding right parenthesis entry. This evaluation may require evaluation of first and second exponentiation commands. In the event that a first exponentiation command has been entered without entry of a corresponding second exponentiation command within this expression, the data processing apparatus assumes that the second exponentiation command belongs immediately prior to the last entered right parenthesis. Therefore any such exponential expressions are evaluated in the manner described above in processing blocks 309 and 310. It should be noted that in the event that a right parenthesis is entered without a prior entry of a corresponding left hand parenthesis, that processing block 313 completely empties both the operand stack and the operator stack and thus evaluates the entire previously entered expression. In addition, the calculated result from this operation is stored in an appropriate position within the operand stack for possible later use in evaluation of further commands. Program 300 is then exited via exit block 314.

In the event that a right hand parenthesis has not been entered, program 300 tests to determine whether an end of expression command has been entered (decision block 315). In the preferred embodiment entry of such an end of expression command is achieved via momentary depression of equal sign key 122. In the event that an end of expression command has been entered then program 300 completely evaluates the entire expression emptying both the operand and operator stacks (processing block 316). In accordance with the teachings of U.S. Pat. No. 4,208,720 this involves implied placement of any missing right parenthesis immediately prior to the end of function command. In addition, this evaluation also involves implied completion of all previously entered first exponentiation commands without corresponding second exponentiation commands via implied placement of any unentered second exponentiation commands immediately prior to the entry of the end of function command. Program 300 is then exited via exit block 317.

In the event that an end of function command has not been received then program 300 is inapplicable. Therefore, program 300 is exited via exit block 318.

In addition to the above described operand and operator stacks, data processing apparatus 200 preferably includes a display memory for displaying groups of entered data and operations in order to alert the user. This display memory is preferably a part of RAM 214, however, this may also be a part of RAM 224 or RAM 232. Read only memory 213 preferably has program steps stored therein in order to cause arithmetic logic unit 211 to generate the proper drive signals so that output device 204 may illustrate the contents of this display memory.

Many scientific calaculators of the type to which the present invention is applicable, are capable of displaying numeric data only. In such a case the display memory would have numeric data stored therein which corresponds to the last entry into the operand stack. This last entry into the operand stack may be made via actuation of numeric data keys 105 or by actuation of a key or a key sequence corresponding to a constant. In addition, this last entry into the operand stack may have been achieved as a result of some computation by the machine, therefore output device 214 would commuincate such calculated results to the operator.

In a preferred embodiment of the present invention display 102 corresponding to output device 204 is preferably constructed in order to display entered operations and other commands as well as numeric data. Numeric data may be displayed via display of numbers corresponding to this data such as the digits 2 and 5 illustrated in display 102. Variable identifiers may be displayed via display of an alphanumeric character corresponding to this variable identifier such as the letter A and B appearing in display 102. In the case of most of the operations illustrated in keyboard 103, there are corresponding well known characters for written or visual display of these operations. Thus display 102 can easily be caused to display a character corresponding to the operations of addition, subtraction, multiplication and division. Similarly, left and right parenthesis also have well known symbols which may be displayed via display 102.

In the preferred embodiment of the present invention new symbols are provided for the new first and second exponentiation commands. In accordance with the preferred embodiment, entry of a first exponentiation command is illustrated via display of an upwardly pointed arrow such as illustrated in display 102. Similarly, entry of a second exponentiation command is displayed via display of a downwardly pointed arrow such as illustrated in display 102. This results in an overall display which may be readily identified by a naive user as an exponent. Thus display 102 has the quantity 2B raised to an exponent corresponding to 5A.

In a further preferred embodiment of the present invention, a multiline display is used to illustrate exponents. The display begins on the lower most line of the multiline display. The display is then moved up one line toward the top of the multiline display upon entry of each first exponentiation command. In such a case display of an upwardly pointed arrow such as illustrated in display 102 is not necessary to adequately illustrate the exponent and therefore this symbol is preferably omitted in this embodiment. In addition, entry of each second exponentiation command causes the display to move down one line from the previous line. In such a case it is also preferable to eliminate the entry of a downwardly pointing arrow. In the event that a number of unpaired first exponentiation commands greater than the number of lines provided is received, then it is preferable that additional first exponentiation commands be displayed on the top line of the multiline display in the manner illustrated for the single line display 102. That is, any additional received first exponentiation commands are illustrated by an upwardly pointing arrow. Additional received second exponentiation commands are illustrated by downwardly pointing arrows until the number of entered second exponentiation commands on the top line equals the number of first exponentiation commands. Thereafter the display is moved down one line in accordance with the normal process upon reception of additional second exponentiation commands.

Figure 4:
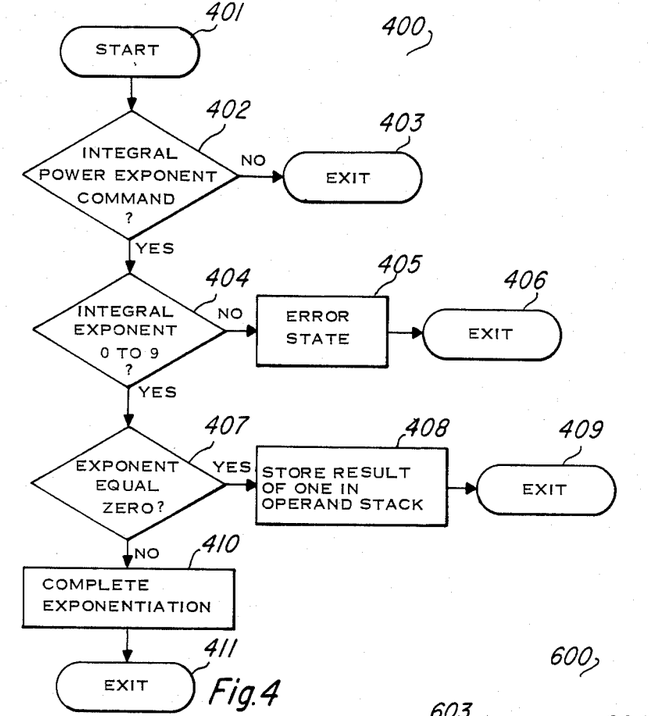
FIG. 4 is a flow chart illustrating the manner of evaluation of the integral power exponentiation command in accordance with the present invention.

FIG. 4 illustrates the operation of the data processing apparatus particularly in conjunction with the operation of the integral power exponentiaton command. As in the case of the flow chart illustrated in FIG. 3, FIG. 4 illustrates only the general steps of a preferred embodiment of the present invention and is not intended to illustrate either the exact details of this operation or to exclude other manners of operating in accordance with teaching of the present invention.

FIG. 4 illustrates program 400. Program 400 is the manner in which the integral power exponentiation command is executed. Program 400 is entered via enter block 401. Program 400 first tests to determine whether this integral power exponentiation command has been entered (decision block 402). In the preferred embodiment entry of this command is achieved via momentary depression of integral power exponentiation key 115. In the event that the integral power exponentiation command has not been entered then program 400 is not applicable and is exited via exit block 403.

Program 400 then tests to determine whether the operand in is a single digit integer (decision block 404). In the preferred embodiment such an entry is made via momentary depression of one of the numeric entry keys 105 corresponding to the digits 0 to 9. As will be clear from the explanation below, the integral power exponentiation command is only defined for case in which the power is a one digit integer. If the operand is not a one digit integer then data processing apparatus 200 enters an error state (processing block 405). Depending upon the particular data processing apparatus, either an error message is generated and the operator is required to clear the machine or the invalid entry is ignored. In any event program 400 is no longer applicable and is exited via exit block 406.

Once it has been determined that the following entry is a one digit integer, program 400 tests to determine whether this operand is zero (decision block 407). In accordance with the well know mathematical laws of exponentiation, regardless of the base operand, if the power operand is zero then the result is one. Therefore, this result one is stored in the appropriate new position within the operand stack (processing block 408) and program 400 is exited (exit block 409).

In the event that the exponent is not 0, then program 400 completes the exponentiation command. This is achieved by assuming that the latest entry within the operand stack, which is the number currently within the numeric display memory, is the base and the following single digit entry is the exponent. Completion of this exponentiation command involves storing the result in an appropriate position within the operand stack and within the numeric display memory. Program 300 is completed and is exited via exit block 411.

In the preferred embodiment, the integral power exponentiation command is displayed via display 102 by placing a superscript N upon initial actuation of the integral power exponentiation command. When the single digit power operand has been entered, this superscript N is then replaced by the particular single digit entered. This corresponds directly to the manner in which such a command would be written. This superscript digit is most conveniently displayed in a single line display such as display 102 by using an upper $3 \times 5$ portion of the of $5 \times 7$ dot matrix used to display this character. In the event that a multiline display as described in above in accordance with the first and second exponentiation commands is employed, then this superscript digit is placed upon the line above the previous line.

Figure 5:
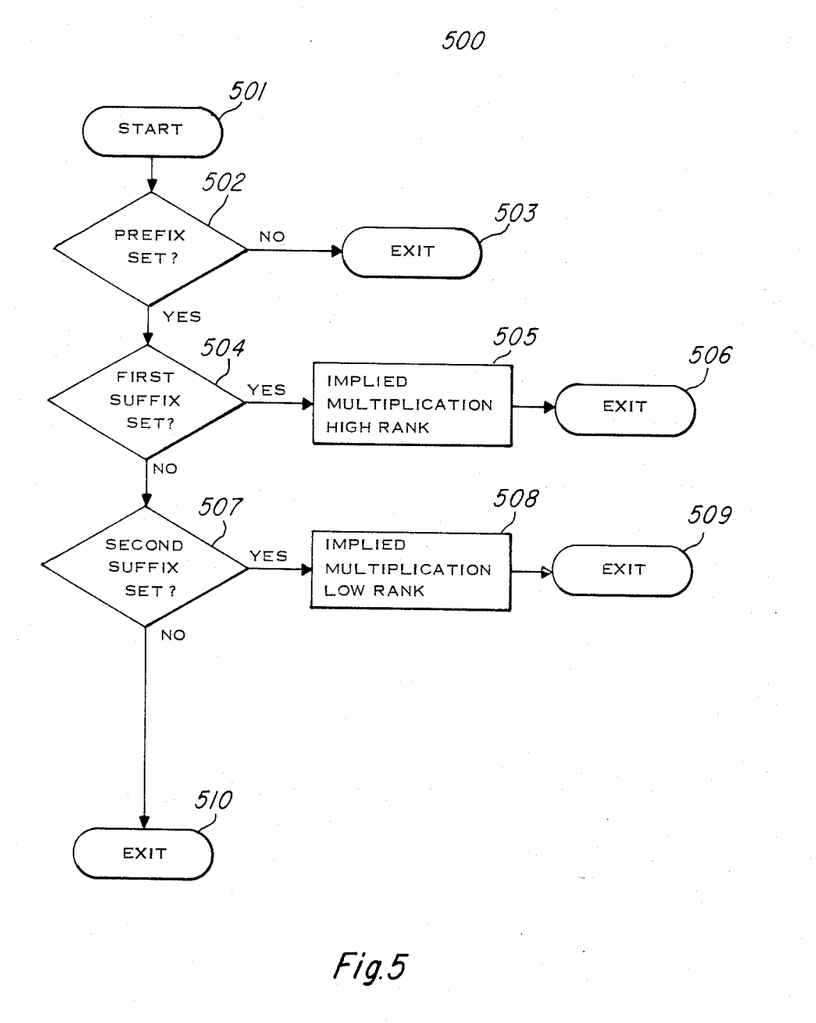
FIG. 5 is a flow chart illustrating the manner in which implied multiplication is evaluated and performed in accordance with the present invention.

FIG. 5 illustrates a flow chart of the manner in which the implied multiplication is performed in accordance with the present invention. In the case of the program illustrated in FIG. 5 it is assumed that the data processing apparatus is evaluating an entered expression, that is it is assumed that the data processing apparatus is within one of processing blocks 309, 313 or 316 illustrated in FIG. 3. When evaluating the expression within a particular parenthesis level, the data processing apparatus 200 checks through each of the characters entered to determine whether an implied multiplication is required for a particular set of adjacent characters. As in the case of the programs illustrated in FIGS. 3 and 4, FIG. 5 is intended only to illustrate the general outline of the steps required in accordance with one embodiment of the present invention and is not intended to illustrate either the exact steps required within a particular apparatus nor to teach the only manner of embodying the present invention.

FIG. 5 illustrates program 500. Program 500 is entered via start block 501. Program 500 first tests to determine whether a particular character is one of a predetermined prefix character set (decision block 502). In the preferred embodiment, this prefix set includes entered numeric data, variable indentifiers, entered constants, such as pi, entered right hand parenthesis and entered second exponentiation commands (down arrow command). Only if a pair of adjacent characters includes as the first member one of this prefix set will an implied multiplication be implemented. It should be noted that entered numeric data is taken as a whole and therefore an entered number 22 could not be interpreted as an implied multiplication of two times two. In the event that the first character of a pair of adjacent characters is not within this pefix set, then program 500 is inapplicable. Therefore, program 500 is exited (exit block 403).

If the first character of a pair of adjacent characters is within the prefix set, then program 500 tests to determine whether the second character is within a first suffix set. The first suffix set includes entered numeric data, entered variables, entered constants and left parenthesis. If one of the prefix set of characters is followed by one of the first suffix set of characters, then an implied multiplication of a high rank is implemented. Upon implementation of this implied multiplication, program 500 is exited (exit block 506).

In the event that the second character of a pair of adjacent characters is not within the first suffix set, program 500 then tests to determine whether this character is within a second suffix set (decision block 507). In the preferred embodiment this second suffix set includes most unary operators such as the trigonometric and logarithmic functions. In the event that the second character of the pair of adjacent characters is with the second suffix set, then an implied multiplication of a low rank is implemented (processing block 508). After implementation of this implied multiplication of the low rank, program 500 is exited (exit block 509). In the event that the second character in the pair of characters is not within the first or the second suffix set, then no implied multiplication is implemented. Therefore, program 500 is exited via exit block 510.

Implementing an implied multiplication having two differing hierarchies, each of these differing hierarchies being higher in rank than an explicit multiplication, has been found to correspond most closely to the ordinary experience of persons in evaluating such implied multiplication commands. This dual rank is particularly necessary in order to correctly achieve the proper operand for most unary operational commands.

This result can most easily be illustrated by a few examples. The expression sin AB is normally interpreted as sin (AB). That is the implied multiplication between AB, A being a variable within the prefix set and B being a variable within the first suffix set, is of higher rank than the unary operation. Therefore this implied multiplication is achieved first to generate the operand for the unary operation. On the contrary written expression sin A cos B is ordinarily interpreted (sin A) X (cos B). That is, although an implied multiplication is achieved from this written statement, this implied multiplication is of a lower rank than the closure of the unary operand, in this case the sine operand. Notice that the variable A is from the prefix set and the unary operator cosine is within the second suffix set. By implementing an implied multiplication of the lower rank the initial sine operator has A as its operand, that is the operand is completed prior to the implied multiplication. Also in accordance with the ordinary expectation, it has been found that evaluation of sin A X B results in the explicit multiplication having a lower rank than the unary operator. That is, this is evaluated as (sin A) X B. Thus the unary operand is first closed and then the explicit multiplication command is completed. By provision of this three different hierarchial levels of multiplication, the high rank implicit multiplication, the low rank implicit multiplication and the even lower rank explicit multiplication, the normal expectation of evaluation of a written equation is more nearly achieved.

Figure 6:
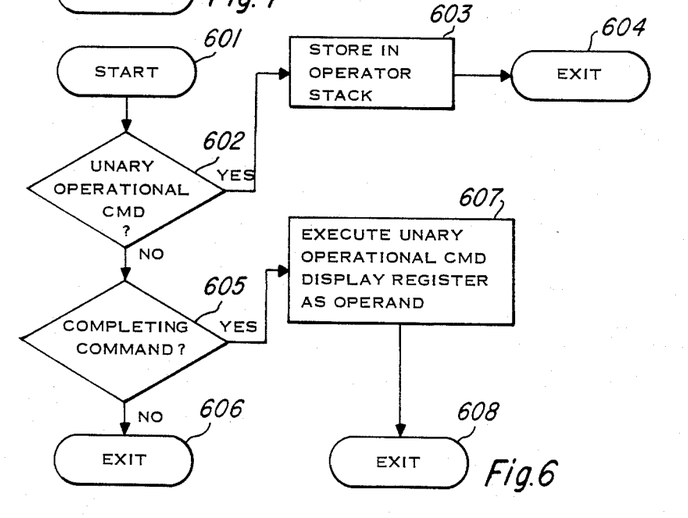
FIG. 6 is a flow chart illustrating the manner in which a unary operational command and its operand are linked in accordance with the present invention.

FIG. 6 is a flow chart illustrating the operation of the present ivention, particularly in the manner in which a unary operational command determines its operand. As explained above, scientific calculators of the type to which the present invention is most applicable employ to differing systems for entering unary operators and their operands. Older calculators generally employ what is known as an immediate operation, that is, the unary operation is performed immediately upon entry with the currently displayed value as its operand. Other calculators, particularly those which have alphanumeric displays for displaying an entered equation require that the operand be entered after the operational command, which is more in line with the manner in which such functions appear in written form. An operator who changes between a machine using one system to one using the other system is often confused and makes mistakes until the new system thoroughly learned. The data processing apparatus in the present invention advantageously employs a system to reduce such errors.

FIG. 6 illustrates program 600. Pragram 600 is entered via start block 601. Program 600 first tests to determine whether a unary operational command has been entered (decision block 602). Entry of a unary operational command is preferably performed by depression of one key or a predetermined sequence of keys of keyboard 103 in accordance with the manner of entering commands set forth above. In the event that such a unary operational command has been received the this command is stored in the operator stack (processing block 603). In accordance with the preferred embodiment discussed above, this also preferably stores this particular unary operation within a display memory for display via display 102. Program 600 is then exited via exit block 604.

In the event that a unary operational command has not been received, program 600 tests to determine whether an operational command which completes a unary operational command has been received (decision block 605). Such a completing operational command may be a right parenthesis entered via momentary depression of right parenthesis key 119 or a end of function command entered via momentary depression of equal sign key 122. In the event that such a completing operational command has not been received then program 600 is inapplicable and is exited via exit block 606.

If such a completing operational command has been received then program 600 causes data processing apparatus 200 to execute the unary operational command using the current numeric value in the numeric display register as the operand (processing block 607). This value within the numeric display register corresponds to the last entry into the operand stack. This number may have been entered after entry of the unary operational command such as entry of sine 45, or it may have been entered prior to entry of the unary operational command such as 75 tangent. This manner of executing the unary operational command has the advantage of automatically finding an operand which is usually the operand intended. For example, if numeric data has been been entered after entry of the unary operational command and prior to entry of the completing command, then this later entered numeric data is always the intended operand for the unary operational command. If, on the other hand, a numeric entry has not been made between the entry of the unary operational command and the entry of the completing command, then the last entry into the operand stack, which may either been entered manually via keyboard 103 or entered by virtue of computation of a result of a previously entered calculation, then this prior entry is generally the desired operand. As in the cases illustrated above, execution of this operational command generates a result which is then stored within an appropriate position within the operand stack and the numeric display register for appropriate later use and display. Once this is achieved, program 600 is exited via exit block 608.

A special case of a unary operational command is the change sign key. The change sign command is preferably entered via momentary depression of change sign key 123. This key is preferably employed to change the sign of an entered or displayed number in order to control whether this number is greater than or less than zero. It is preferably to link the change sign operational command to its operand in a manner similar to that described above in conjunction with FIG. 6, however, because this command is implemented in a different manner, it is not possible to take the easy expedient of causing this operator to operate only upon the last entered operand. Instead, it is necessary to provide a specific set of tests in order to insure that the change sign command is linked with the proper operand.

Figure 7:
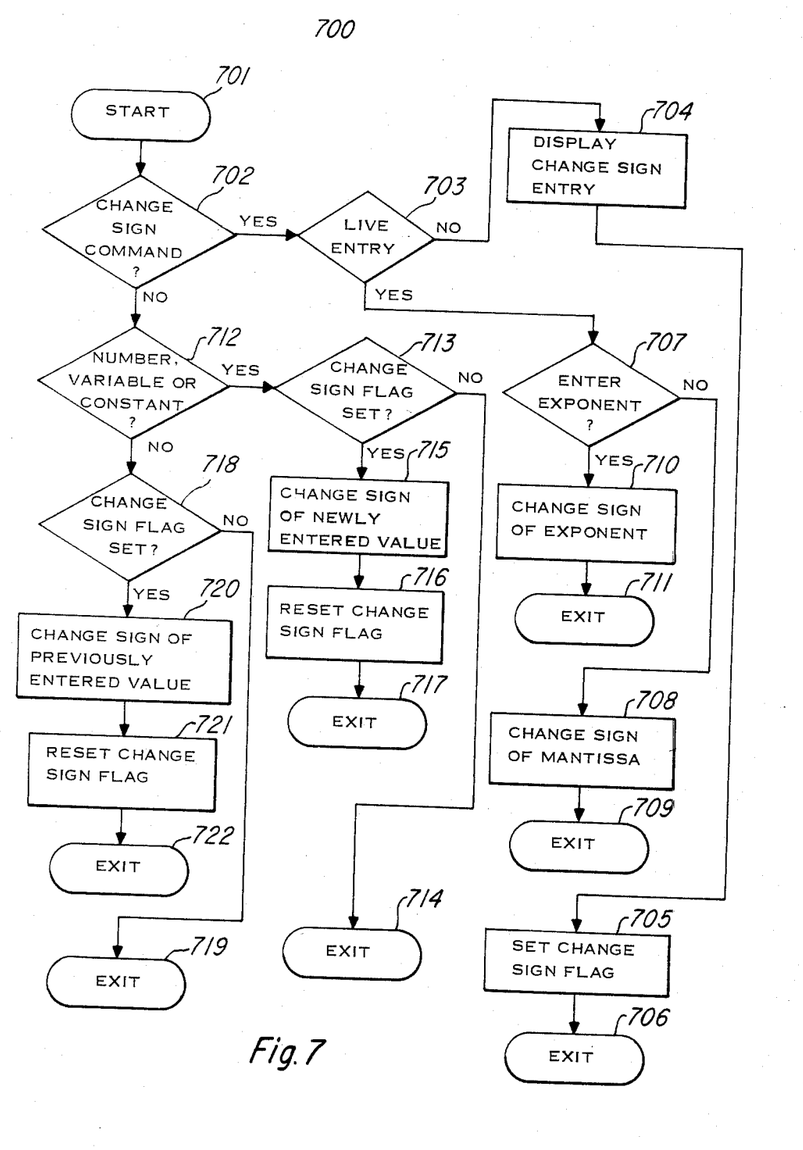
FIG. 7 is a flow chart illustrating the manner in which a change sign command and its operand are linked in accordance with the present invention.

FIG. 7 is a flow chart illustrating the general steps of the technique employed to link the change sign command with its operand. FIG. 7 illustrates program 700. Program 700 is entered via start block 701. Program 700 first tests to determine whether a change sign operational command has been received (decision block 702). In accordance with the preferred embodiment, entry of such a change sign operational command is achieved via momentary actuation of change sign key 123.

In the event that such a change sine command has been entered then program 700 tests to determine whether the data processing apparatus is in live entry mode (dicision block 703). In the event that the data processing apparatus is not in live entry mode then display 102 is set to illustrate the entry of such a change sign command (processing block 704) and an internal flag within data processing apparatus 200 is set (processing block 705). Program 700 is then exited (exit block 706).

If, on the other hand, the data processing apparatus is in live entry mode then program 700 next tests to deterine whether an enter exponent command has been entered (decision block 707). In accordance with the preferred embodiment, data may be entered in scientific notation by entry of a mantissa followed by an entry of an exponent. Entry of an exponent is achieved via entry of an enter exponent command followed by entry of the appropriate exponent via numeric entry keys 105. In the preferred embodiment the enter exponent command is achieved via momentary actuation of enter exponent key 124. If an enter exponent command has not been received then the data processing apparatus changes the sign of the mantissa of the numeric live entry (processing block 708) and program 700 is exited (exit block 709). On the contrary if an enter exponent command has been received, then data processing apparatus 200 changes the sign of the exponent of the numeric live entry (processing block 710). Thereafter, program 700 is exited (exit block 711).

If a change sign command has not been received, program 700 tests to determine whether numeric data, variable identifiers or a constant has been received (decision block 712). In such an event, program 700 tests to determine whether the change sign flag has been set (decision block 713). If the change sign flag has not been set then program 700 is exited (exit block 714). On the other hand, if the change sign flag has been set then data processing apparatus 200 changes the sign of the mantissa of the displayed value (processing block 716) and then resets the change sign flag (processing block 715). Thereafter, program 700 is exited via exit block 717.

In the event that neither a change sign command nor numeric data, variable identifiers or constants have been entered then program 700 tests to determine whether the change sign flag is set (decision block 718). If the change sign flag has not been set then program 700 is exited (exit block 719). If change sign flag has been set then program 700 changes the sign of the mantissa of the previously displayed value (processing block 720). Thereafter, program 700 resets the change sign flag (processing block 720) and program 700 is exited (exit block 722).

What is claimed is:

1. An electronic data processing apparatus comprising:
   an input means for entering data processing functions including numeric data and a plurality of operational commands, said operational commands including at least one unary operational command corresponding to a data processing operation having a single operand, and including at least one unary operation completing command;
   and arithmetic means for performing entered data processing functions and generating a numeric result, said arithemtic means including a unary operation means for performing unary operational commands upon entry of a unary operation completing command employing the numeric data entered after entry of said unary operational command as the operand if numeric data is entered after entry of said unary operational command prior to entry of said unary operation completing command, and for performing entered unary operational commands on the numeric data entered prior to entry of said unary operational command if no numeric data is entered following entry of said unary operational command prior to entry of said unary operation completing command; and
   an output means for generating an operator perceivable indication of said numeric result generated by said arithmetic means.

2. A electronic data processing apparatus as claimed in claim 1, wherein:
   said at least one unary operational command of said input means includes at least one trigonometric operation.

3. An electronic data processing apparatus as claimed in claim 1, wherein:
   said at least one unary operational command of said input means includes at least one logarithmic operation.

4. A data processing apparatus as claimed in claim 1, wherein:
   said at least one unary operation completing command includes a right parenthesis operational command.

5. A data processing apparatus as claimed in claim 1, wherein:
   said at least one unary operation completing command includes an equal sign operational command.

6. A data processing apparatus comprising: an input means for entering data processing functions including numeric data and a plurality of operational commands, said operational commands including at least one unary operational command corresponding to a data processing operation having a single operand, and at least one unary operation completing command;
   an arithemtic means for performing entered data processing functions and generating a numeric result, said arithmetic means including (1) operator stack means for storing entered unperformed operational commands, (2) operand stack means for storing entered numeric data forming operands of said unperformed operational commands stored in said operator stack means, (3) means for performing operational commands stored in said operator stack using numeric data stored in said operand stack and generating a result, including means for performing a stored unary operational command using said numeric data last entered into said operand stack as the operand of said unary operational command upon the later entry of a unary operation completing command; and
   and output means for generating an operator perceivable indication of said numeric result generated by said arithmetic means.

7. A data processing apparatus as claimed in claim 6, wherein:

said at least one unary operation completing command includes a right parenthesis operational command.

8. A data processing apparatus as claimed in claim 6, wherein:

said at least one unary operation completing command includes an equal sign operational command.

* * * * *